United States Patent [19]

Fukaya et al.

[11] 3,950,672
[45] Apr. 13, 1976

[54] CIRCUIT FOR PRODUCING CORRECTLY TIMED VERTICAL BLANKING PULSES FROM A VERTICAL SWEEP CIRCUIT

[75] Inventors: Hirokazu Fukaya, Tokyo; Kenji Andou; Akio Nakashima, both of Yokohama, all of Japan

[73] Assignee: Nippon Electric Co., Ltd., Tokyo, Japan

[22] Filed: June 10, 1974

[21] Appl. No.: 477,987

[30] Foreign Application Priority Data
June 11, 1973 Japan.................................. 48-64839

[52] U.S. Cl. .................. 315/389; 315/397; 315/407
[51] Int. Cl.² ...................... H01J 29/70; H01J 29/72
[58] Field of Search ........... 315/389, 396, 397, 399, 315/403, 407

[56] References Cited
UNITED STATES PATENTS
2,964,673  12/1960  Stanley ............................... 315/397
3,303,380  2/1967  Kozikowski......................... 315/389

Primary Examiner—Richard A. Farley
Assistant Examiner—T. M. Blum
Attorney, Agent, or Firm—John M. Calimafde

[57] ABSTRACT

A vertical sweep circuit includes a first transistor supplied with a sawtooth voltage. A voltage drop is developed across a resistor by a vertical sweep current for producing a first voltage across a first load. A second transistor is supplied with the first voltage for producing a second voltage across a second load, and a pair of push-pull connected transistors are supplied with the second voltage for producing the sweep current. An additional transistor of the same conductivity type as the second transistor is included in the circuit. Responsive to the first voltage, the additional transistor produces voltage pulses at a point of connection thereto of an additional load, which is greater than the second load to make the second and additional transistors operate as a linear amplifier transistor and a switching transistor, respectively. Vertical blanking pulses are produced from the voltage pulses.

6 Claims, 8 Drawing Figures

CIRCUIT FOR PRODUCING CORRECTLY TIMED VERTICAL BLANKING PULSES FROM A VERTICAL SWEEP CIRCUIT

BACKGROUND OF THE INVENTION

This invention relates to a circuit for producing vertical blanking pulses for a television picture tube.

As will be described in detail below with reference to the accompanying drawings, the vertical blanking pulses produced by a conventional television circuit are not correctly timed. As a result, it has been impossible to carry out correct vertical blanking.

SUMMARY OF THE INVENTION

It is therefore an object of the present invention to provide a circuit for producing correctly timed vertical blanking pulses for a television picture tube.

It is another object of this invention to provide a vertical blanking circuit of the type described, capable of carrying out correct vertical blanking.

A vertical blanking circuit includes means for producing vertical blanking pulses from voltage pulses derived from a vertical sweep circuit. The vertical sweep circuit comprises a first transistor means supplied with a sawtooth voltage to develop a voltage drop across a resistor by a vertical sweep current for producing a first voltage across a first load. The first voltage falls to zero during vertical flyback periods and rises above zero during vertical sweep periods. The sweep circuit further comprises a second transistor means supplied with the first voltage for producing a second voltage across a second load and a pair of push-pull connected transistors supplied with the second voltage for producing the sweep current. According to this invention, an additional transistor means is included in the sweep circuit. Responsive to the first voltage, the additional transistor means produces the voltage pulses at a point of connection thereto of an additional load, which is greater than the second load to make the second and additional transistors operate as a linear amplifier transistor and a switching transistor, respectively.

BRIEF DESCRIPTION OF THE DRAWINGS

For a more detailed understanding of the invention, reference may be made to the following detailed description of a preferred embodiment taken in conjunction with the accompanying drawings wherein.

DESCRIPTION OF THE PREFERRED EMBODIMENT

Figure 1:
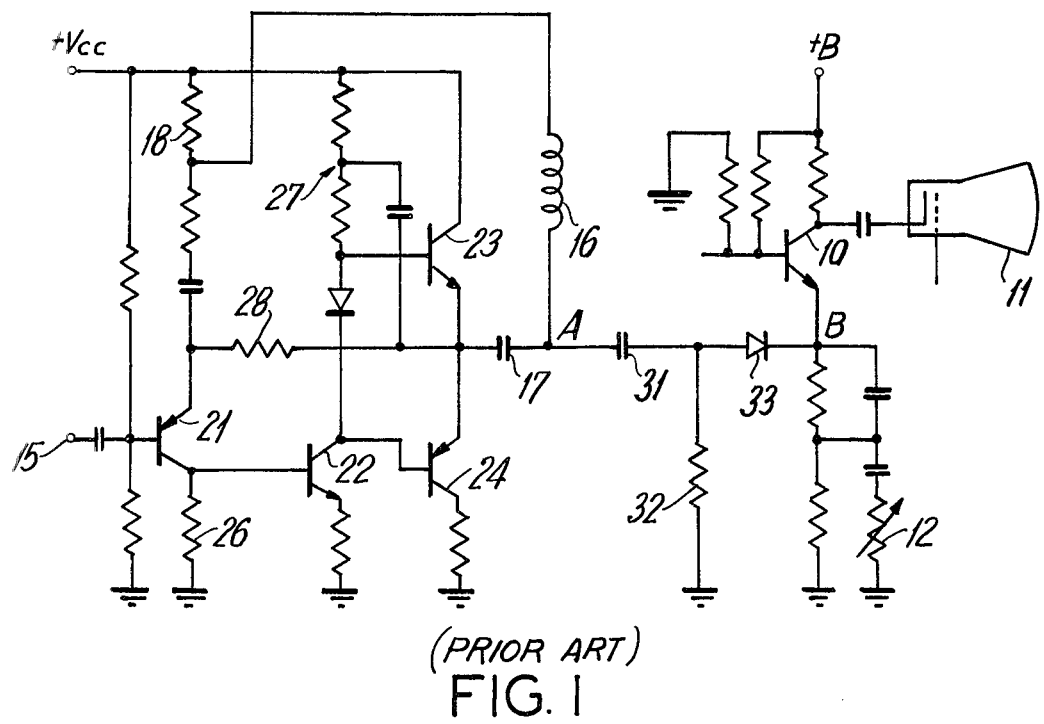
FIG. 1 schematically shows a conventional vertical blanking circuit together with a vertical sweep circuit and other related parts of a television receiver.

Referring to FIGS. 1 through 4, a conventional vertical blanking circuit will be described first in order to facilitate an understanding of the present invention. The circuit derives vertical blanking pulses from a vertical sweep circuit and supplies the same to the emitter of a video output transistor 10 coupled to the cathode of a television picture tube 11. The transistor 10 is accompanied by an emitter circuit including a contrast adjusting variable resistor 12. Responsive to a sawtooth voltage supplied from a vertical sweep oscillator (not shown) to an input terminal 15 and connected to a power source $V_{cc}$, the vertical sweep circuit supplies a vertical sweep current to a deflection coil 16 for the picture tube 11 through a coupling capacitor 17 and a resistor 18 connected to the power source $V_{cc}$.

Referring more specifically to FIG. 1, the vertical sweep circuit comprises a first transistor 21, a second transistor 22, and a pair of push-pull connected transistors 23 and 24. In the example being described, the base of the first transistor 21 is supplied with the sawtooth voltage. The emitter of the first transistor 21 is supplied with a voltage drop developed across the resistor 18 by the sweep current. Inasmuch as the voltage drop varies in sawtooth wave form, the first transistor 21 is nonconductive during vertical flyback periods and conductive to make a gradually increasing current flow through a first collector resistor 26 during vertical sweep period. The base of the second transistor 22 is supplied with a first voltage developed across the first collector resistor 26 in the manner shown in FIG. 2. The second transistor 22 therefore becomes repeatedly conductive and nonconductive to produce a second voltage across a second collector resistor 27. Supplied with the second voltage, the push-pull connected transistors 23 and 24 are rendered conductive as a linear amplifier transistor pair each time the second transistor 22 becomes conductive. When the second transistor 22 is nonconductive, the transistor 23 connected between the power source $V_{cc}$ and the coupling capacitor 17 is rendered conductive while the other transistor 24 is rendered nonconductive whereby the sweep current is caused to flow through the deflection coil 16. Incidentally, a point of connection between the push-pull connected transistors 23 and 24 is connected to the emitter of the first transistor 21 through a d.c. feedback resistor 28 so that the d.c. potential of the connection point can be held substantially constant.

Figure 3A:
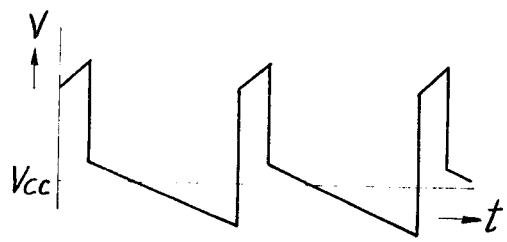
FIGS. 3(a) and 3(b) likewise show wave forms developed in the conventional vertical sweep circuit.

Further referring to FIG. 1, the conventional vertical blanking circuit comprises a blocking capacitor 31 interposed between (1) a first point of connection A between the vertical sweep and blanking circuits and (2) a second point of connection between an amplitude adjusting resistor 32 and the anode of a diode 33 of the blanking circuit. The cathode of the diode 33 is connected to a third point of connection B between the emitter of the video output transistor 10 and the emitter circuit therefor. The waveform comprising voltage pulses developed at the first point of connection A and exemplified in FIG. 3(a) is supplied to the anode of the diode 33 with the d.c. component blocked and the amplitude adjusted. On the other hand, the emitter of the video output transistor 10 is biassed to an approximately constant voltage $V_E$ shown in FIG. 3(b) by the current flowing from the base of the transistor 10. As a result, the diode 33 supplies the video output transistor 10 with those portions 35 of the d.c. blocked and amplitude adjusted voltage pulses which rise above the emitter voltage $V_E$. The video output transistor 10 is thus rendered nonconductive during the presence of the voltage pulse portions 35 to produce positive pulses at its collector, which cut off the electron beam in the picture tube 11.

Figure 3B:
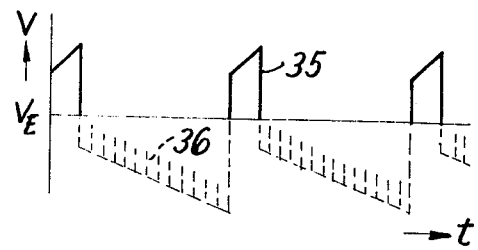
Figure 4:
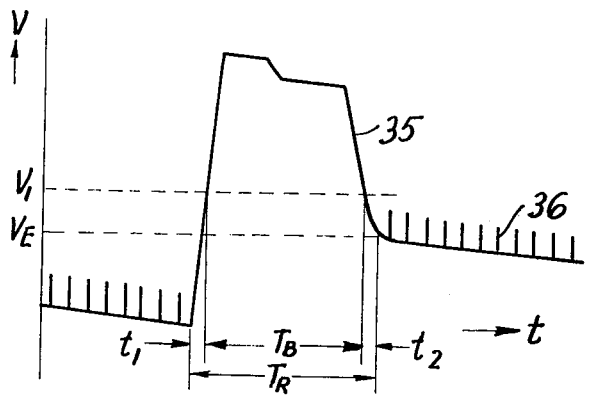
FIG. 4 shows a vertical blanking pulse produced by the conventional vertical blanking circuit, with the time axis extended.

In connection with the circuitry illustrated with reference to FIG. 1, it is to be pointed out that the inevitable crosstalk from the horizontal deflection coil (not shown) for the picture tube 11 superimposes the horizontal scanning pulses as noises 36 depicted in FIG. 3(b) on the voltage pulses developed at the first point of connection A and that each of the voltage pulse portions 35 does not have ideal leading and trailing edges as exemplified in FIG. 4. In view of these facts, it becomes necessary to use only those portion of the voltage pulse portions 35 as the vertical blanking pulses which are above a voltage level $V_1$ and therefore higher than the noises 36. When the vertical blanking level is set at the voltage level $V_1$, an actual vertical blanking period $T_B$ begins a first time interval $t_1$ later at the leading edge and ends a second time interval $t_2$ later at the trailing edge as compared with a vertical flyback period $T_R$. As a result, retrace lines appear visible at the top and bottom of a television picture during the time intervals $t_1$ and $t_2$.

Figure 5:
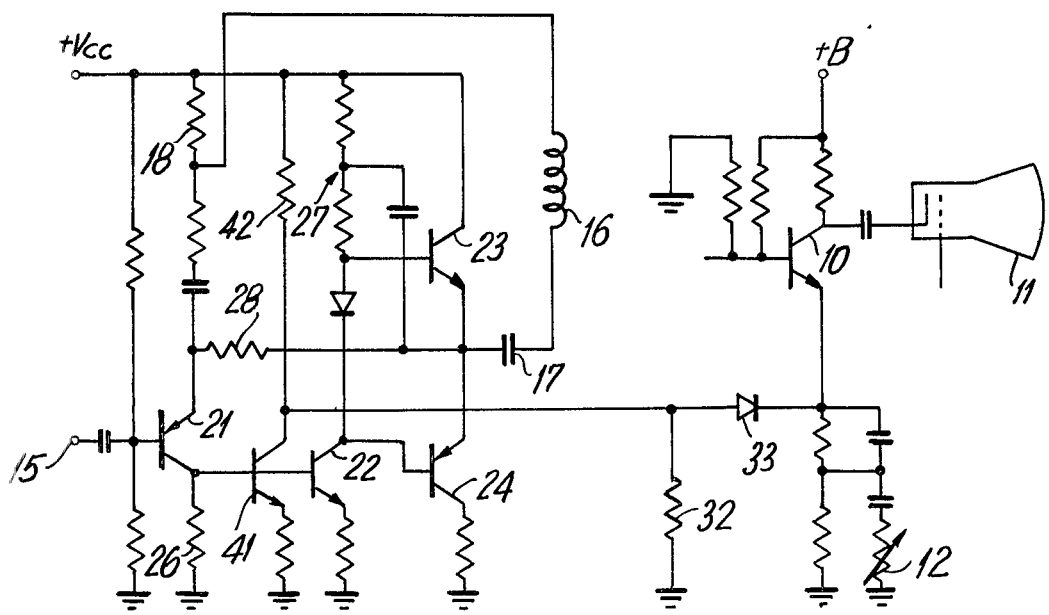
FIG. 5 schematically shows a vertical blanking circuit according to the instant invention, together with a vertical sweep circuit and other related parts of a television receiver.
Figure 2:
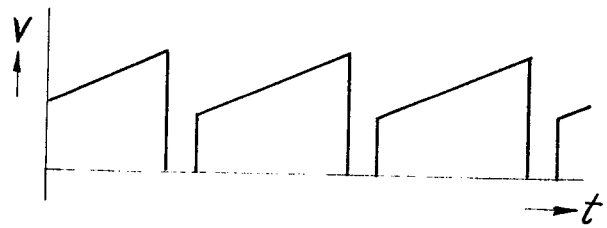
FIG. 2 similarly shows a wave form developed in the vertical sweep circuit.
Figure 6A:
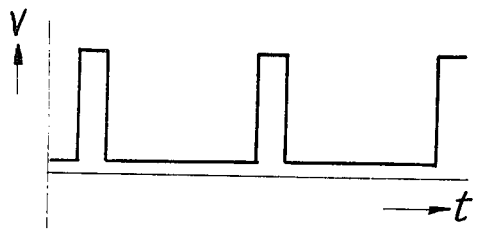
FIGS. 6(a) and 6(b) likewise show wave forms developed in the circuit according to this invention.
Figure 6B:
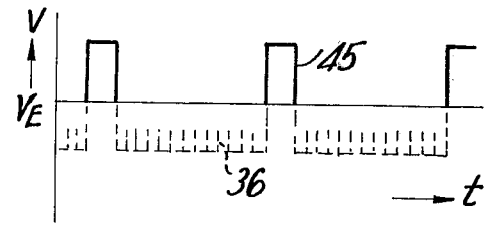

Referring now to FIG. 5, a circuit according to a preferred embodiment of this invention is used in combination with a television pucture tube circuit and a vertical sweep circuit of substantially the same structure as the counterpart circuits described with reference to FIGS. 1 through 4. The vertical sweep circuit, however, comprises an additional transistor 41 of the same conductivity type as the second transistor 22, having a collector that is connected to the power source $V_{cc}$ through an additional resistor 42 and to the anode of the diode 33 directly without the blocking capacitor 31. The additional resistor 42 has a greater resistance than the second collector resistor 27 to make the second and additional transistors 22 and 41 operate as a linear amplifier transistor and a switching transistor, respectively, although both are likewise driven by the first voltage. Preferably, the additional resistor 42 is about five to ten times as large as the second collector resistor 27. The additional transistor 41 is put into the saturated state when even a small voltage difference is supplied to its base. In addition, the additional transistor 41 operates stably because it is included in a negative feedback loop comprising the first, second, and push-pull connected transistors 21 through 24 and the d.c. feedback resistor 28. The additional transistor 41 is rendered conductive and nonconductive by the first voltage shown in FIG. 2 during the vertical sweep periods and the vertical flyback periods, respectively. The voltage developed at the point of connection A of the blanking circuit with the additional transistor 41 forms voltage pulses for vertical blanking the peak value of which depends on the resistance ratio of the resistors 42 and 32 and the width of which is in correct timed relation to each flyback period, in the manner depicted in FIG. 6(a). Those portions 45 of the pulses which rise above the emitter voltage $V_E$ of the video output transistor 10 as shown in FIG. 6(b) are now used as correctly timed vertical blanking pulses. Incidentally, the second and additional transistors 22 and 41 may be a combined or a doublecollector transistor. This reduces the cost of the circuit according to this invention, particularly when the vertical sweep and blanking circuits are formed by integrated circuit techniques. It will now be appreciated that the additional transistor 41 and the additional resistor 42 serve as a part of the vertical blanking circuit rather than as a part of the vertical sweep circuit.

This invention has thus far been described specifically in conjunction with a broadcast television receiver. It will be readily understood by those skilled in the art that "television" means not only means television in the broadcast but sense also closed circuit television and the reproduction of recorded video signals.

Other variations and modifications of the invention will occur to those skilled in the art. The above-described embodiments are exemplary and do not limit the scope of the invention.

What is claimed is:

1. A television circuit including a vertical deflection coil, a resistor connected to said coil, vertical sweep circuit means responsive to a sawtooth voltage for supplying a vertical sweep current through said resistor to said deflection coil, said vertical sweep circuit means comprising a first load, first transistor means for developing a voltage drop across said resistor in response to said sawtooth wave, and for producing across said first load a first voltage that falls to zero during vertical flyback periods and rises above zero during vertical sweep periods, a second load, second transistor means connected to said second load and responsive to said first voltage for producing a second voltage across said second load, and a pair of push-pull connected transistors responsive to said second voltage for producing said sweep current, wherein the improvement comprises an additional load and additional transistor means of the same conductivity type as said second transistor means connected to said additional load and responsive to said first voltage for producing voltage pulses for vertical blanking independently of said second voltage at a point of connection of said additional transistor means with said additional load, said additional load being greater than said second load whereby said additional transistor means serves as a switching transistor and said second voltage is linear with respect to said first voltage.

2. The television circuit of claim 1, wherein said additional transistor is included in a negative feedback loop formed by said first transistor means, said second transistor means, and said push-pull transistors.

3. A television circuit including a vertical deflection coil, a resistor connected to said coil, vertical sweep circuit means responsive to a sawtooth voltage for supplying a vertical sweep current through said resistor to said deflection coil, said vertical sweep circuit means comprising a first load, first transistor means for developing a voltage drop across said resistor in response to said sawtooth wave, and for producing across said first load a first voltage that falls to zero during vertical flyback periods and rises above zero during vertical sweep periods, a second load, second transistor means connected to said second load and responsive to said first voltage for producing a second voltage across said second load, and a pair of push-pull connected transistors responsive to said second voltage for producing said sweep current, wherein the improvement comprises an additional load approximately five to seven times as large as said second load and additional transistor means of the same conductivity type as said second transistor means connected to said additional load and responsive to said first voltage for producing voltage pulses for vertical blanking at a point of connection of said additional transistor means with said additional load, said additional load being greater than said second load whereby said additional transistor means serves as a switching transistor and said second voltage is linear with respect to said first voltage.

4. A television circuit including a vertical deflection coil, a resistor connected to said coil, vertical sweep circuit means responsive to a sawtooth voltage for supplying a vertical sweep current through said resistor to said deflection coil, said vertical sweep circuit means comprising a first load, first transistor means for developing a voltage drop across said resistor in response to said sawtooth wave, and for producing across said first load a first voltage that falls to zero during vertical flyback periods and rises above zero during vertical sweep periods, a second load, second transistor means connected to said second load and responsive to said first voltage for producing a second voltage across said second load, and a pair of push-pull connected transistors responsive to said second voltage for producing said sweep current, wherein the improvement comprises an additional load and additional transistor means of the same conductivity type as said second transistor means and jointly formed with said second transistor means as a double collector transistor connected to said additional load and responsive to said first voltage for producing voltage pulses for vertical blanking at a point of connection of said additional transistor means with said additional load, said additional load being greater than said second load whereby said additional transistor means serves as a switching transistor and said second voltage is linear with respect to said first voltage.

5. A television circuit including a vertical deflection coil, a resistor connected to said coil, vertical sweep circuit means responsive to a sawtooth voltage for supplying a vertical sweep current through said resistor to said deflection coil, said vertical sweep circuit means comprising a first load, first transistor means for developing a voltage drop across said resistor in response to said sawtooth wave, and for producing across said first load a first voltage that falls to zero during verticall flyback periods and rises above zero during vertical sweep periods, a second load, second transistor means connected to said second load and responsive to said first voltage for producing a second voltage across said second load, and a pair of push-pull connected transistors responsive to said second voltage for producing said sweep current, wherein the improvement comprises an additional load, additional transistor means of the same conductivity type as said second transistor means connected to said additional load and responsive to said first voltage for producing voltage pulses for vertical blanking at a point of connection of said additional transistor means with said additional load, said additional load being greater than said second load whereby said additional transistor means serves as a switching transistor and said second voltage is linear with respect to said first voltage, the improvement further comprising a diode arranged to receive the voltage pulses from said additional transistor means and a video output transistor connected to said diode without a blocking capacitor.

6. The television circuit of claim 5, where in said first transistor includes a collector connected to the first load to form a first point of connection, said additional transistor means including a collector connected to said first point of connection, said additional load being connected to said diode to form a second point of connection, the collector of said additional transistor also being connected to said second point of connection, and said second transistor means including an emitter with the collector of said additional transistor means also being connected to said emitter.

* * * * *

UNITED STATES PATENT OFFICE
CERTIFICATE OF CORRECTION

Patent No. 3,950,672                    Dated  April 13, 1976

Inventor(s) Hirokazu Fukaya; Kenji Andou; Akio Nakashima

It is certified that error appears in the above-identified patent and that said Letters Patent are hereby corrected as shown below:

Claim 5, column 6, line 5 change "verticall" to --vertical--;

Claim 6, column 6, line 28, delete "where in" and insert

--wherein--.

Page 1, name of Assignee incorrectly printed. It should read Nippon Electric Company, Limited rather than Nippon Electric Co., Ltd.

Signed and Sealed this

Twenty-seventh Day of July 1976

[SEAL]

Attest:

RUTH C. MASON
*Attesting Officer*

C. MARSHALL DANN
*Commissioner of Patents and Trademarks*